(12) United States Patent
Dowdall et al.

(10) Patent No.: US 12,437,548 B1
(45) Date of Patent: Oct. 7, 2025

(54) VISION BASED OBJECT REPRESENTATION

(71) Applicant: Zoox, Inc., Foster City, CA (US)

(72) Inventors: Jonathan Tyler Dowdall, San Francisco, CA (US); Kratarth Goel, Albany, CA (US); Adam Edward Pollack, San Francisco, CA (US); Scott M. Purdy, Lake Forest Park, WA (US)

(73) Assignee: Zoox, Inc., Foster City, CA (US)

( * ) Notice: Subject to any disclaimer, the term of this patent is extended or adjusted under 35 U.S.C. 154(b) by 384 days.

(21) Appl. No.: 17/555,257

(22) Filed: Dec. 17, 2021

(51) Int. Cl.
| | |
|---|---|
| *G06V 20/56* | (2022.01) |
| *B60W 60/00* | (2020.01) |
| *G01S 7/48* | (2006.01) |
| *G01S 17/87* | (2020.01) |
| *G06T 7/11* | (2017.01) |
| *G06T 7/50* | (2017.01) |
| *G06V 10/22* | (2022.01) |
| *G06V 10/764* | (2022.01) |
| *G06V 10/774* | (2022.01) |
| *G06V 10/80* | (2022.01) |

(52) U.S. Cl.
CPC ......... *G06V 20/56* (2022.01); *B60W 60/0015* (2020.02); *G01S 7/4802* (2013.01); *G01S 17/87* (2013.01); *G06T 7/11* (2017.01); *G06T 7/50* (2017.01); *G06V 10/225* (2022.01); *G06V 10/764* (2022.01); *G06V 10/774* (2022.01); *G06V 10/803* (2022.01); *B60W 2420/403* (2013.01); *B60W 2420/408* (2024.01); *B60W 2554/4029* (2020.02); *G06T 2207/20081* (2013.01); *G06T 2207/20132* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,983,217 B2 * | 4/2021 | Nezhadarya | G06T 11/00 |
| 2020/0160559 A1 * | 5/2020 | Urtasun | G06T 7/55 |

(Continued)

FOREIGN PATENT DOCUMENTS

| | | | | |
|---|---|---|---|---|
| CN | 113139602 A | * | 7/2021 | G06F 18/25 |

OTHER PUBLICATIONS

Cai, Yingjie, et al. "Monocular 3d object detection with decoupled structured polygon estimation and height-guided depth estimation." Proceedings of the AAAI Conference on Artificial Intelligence. Vol. 34. No. 07. 2020. (Year: 2021).*

(Continued)

*Primary Examiner* — Matthew C Bella
*Assistant Examiner* — Johnny B Duong
(74) *Attorney, Agent, or Firm* — Lee & Hayes, P.C.

(57) ABSTRACT

Techniques for refining an image-based bounding box with depth data from a lidar sensor to represent an object in an environment of a vehicle are discussed herein. A vehicle computing device can implement a model to determine a three-dimensional bounding box based on image data. The vehicle computing device can implement a same of different model to update the three-dimensional bounding box based at least in part on depth information associated with lidar data. The techniques can also include training one or more machine learned models to determine three-dimensional bounding boxes usable by a vehicle to navigate in the environment.

20 Claims, 6 Drawing Sheets

(56) References Cited

U.S. PATENT DOCUMENTS

2021/0405638 A1* 12/2021 Boyraz ................. G06V 20/64
2022/0005332 A1*  1/2022 Metzler ............... G06F 18/2431
2022/0406010 A1* 12/2022 Radha .................... G01S 17/42

OTHER PUBLICATIONS

Farahnakian, Fahimeh, and Jukka Heikkonen. "Fusing lidar and color imagery for object detection using convolutional neural networks." 2020 IEEE 23rd International Conference on Information Fusion (FUSION). IEEE, 2020. (Year: 2020).*
Vora, Sourabh, et al. PointPainting: Sequential Fusion for 3D Object Detection. arXiv:1911.10150, arXiv, May 6, 2020. arXiv.org, https://doi.org/10.48550/arXiv.1911.10150. (Year: 2020).*
Liang, Ming, et al. "Multi-task multi-sensor fusion for 3d object detection." Proceedings of the IEEE/CVF conference on computer vision and pattern recognition. 2019. (Year: 2019).*
Li, Peiliang, Siqi Liu, and Shaojie Shen. "Multi-sensor 3d object box refinement for autonomous driving." arXiv preprint arXiv:1909.04942 (2019). (Year: 2019).*
Kim, Youngseok, Jun Won Choi, and Dongsuk Kum. "Grif net: Gated region of interest fusion network for robust 3d object detection from radar point cloud and monocular image. In 2020 IEEE." RSJ International Conference on Intelligent Robots and Systems (IROS). (Year: 2020).*
Liang, et al., "Multi-Task Multi-Sensor Fusion for 3D Object Detection" 2019 IEEE/CVF Conference on Computer Vision and Pattern Recognition, Jun. 2019, 9 pages.

* cited by examiner

VISION BASED OBJECT REPRESENTATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
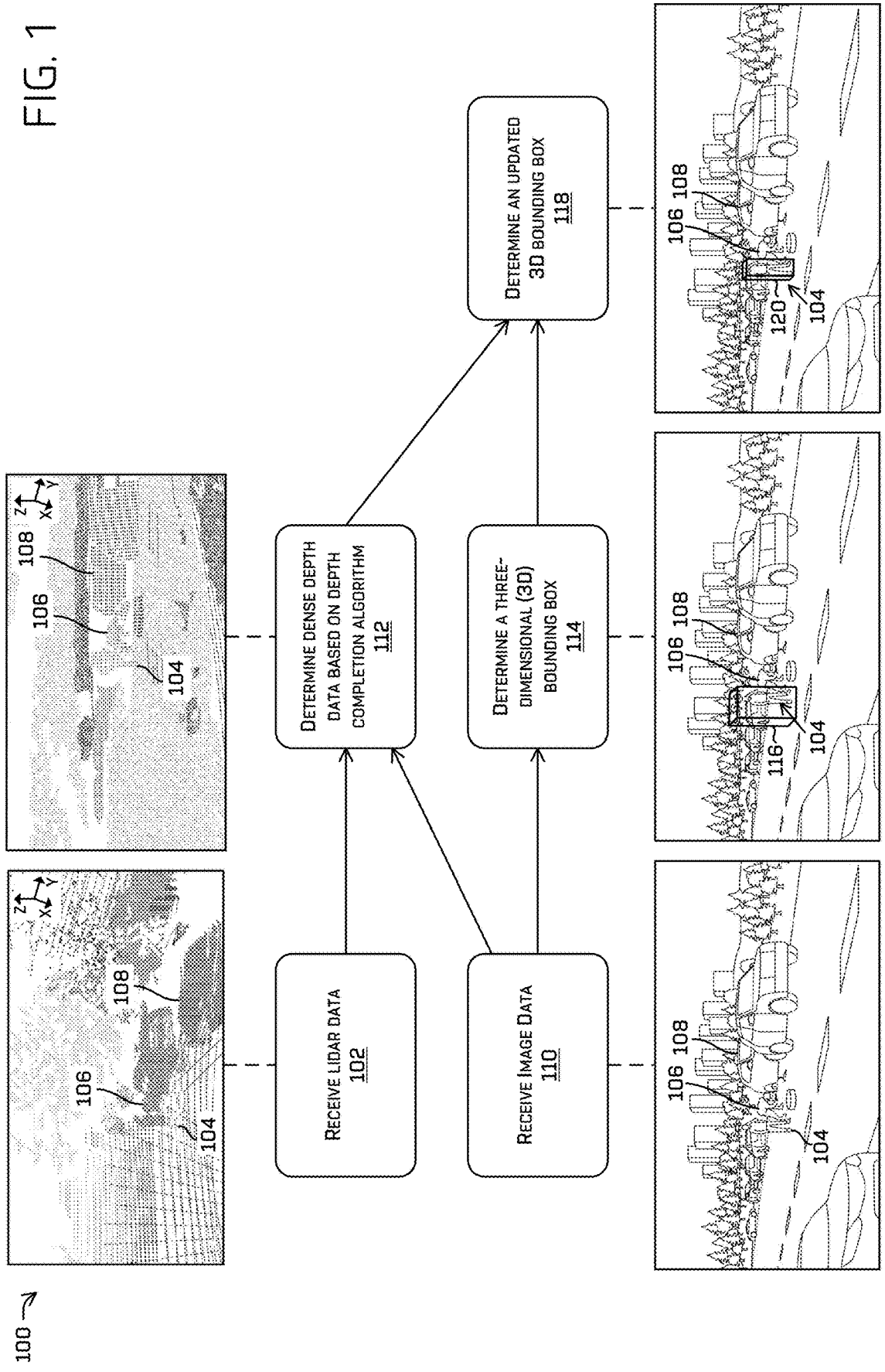
FIG. 1 is a pictorial flow diagram of an example process of determining a three-dimensional bounding box.

This application describes techniques for refining an image-based bounding box with depth data from a lidar sensor to represent an object in an environment of a vehicle. For instance, a vehicle computing device can receive image data from an image sensor and determine a three-dimensional (3D) bounding box based on the image data. The vehicle computing device can also receive lidar data from a lidar sensor and determine depth data associated with an object in an environment of the vehicle based at least in part on the image data and the lidar data. The 3D bounding box (determined from the image data) and the depth data can be input into a machine learned model to update or otherwise refine a boundary, a shape, a position, and/or a size of the 3D bounding box. Using the techniques described herein, a vehicle may receive an updated 3D bounding box from the machine learned model usable by the vehicle to quickly and/or preemptively avoid objects, thereby improving safety of the vehicle.

Generally, the techniques described herein enable an autonomous vehicle to safely plan for scenarios such as potential interactions with objects (e.g., a vehicle, a pedestrian, a bicyclist, etc.), traffic sign interactions, etc. For instance, the autonomous vehicle can determine an action (e.g., a braking action, an acceleration action, a trajectory, etc.) for the autonomous vehicle based at least in part on an output from a machine learned model configured to refine a vision-based 3D bounding box using depth data. The refined 3D bounding box can represent a static or dynamic object in an environment of the autonomous vehicle. In this way, the machine learned model can provide "situational awareness" to safely navigate the autonomous vehicle in the environment.

In some examples, an object detector component of the vehicle computing device can implement one or more machine learned models that efficiently and accurately combine sensor data associated with different sensor modalities to determine a representation of one or more objects in an environment of a vehicle. For example, an object detector component can determine an object representation (e.g., a three-dimensional bounding box) based on image data (e.g., two-dimensional image data) from one or more image sensors. The imaging sensors may not inherently sense depth information. The object detector component can refine the initially proposed object representation (based on the image data lacking inherent depth information) using depth data from one or more sensors that are capable of measuring depth information in a vicinity of the object. Thus, an initial object representation can be based on a first modality, such as image sensor(s), and depth data from another sensor type (e.g., a lidar sensor, a time-of-flight sensor, and the like) can be used to refine extents of the object representation.

In some examples, the object detector component can receive image data representing the environment and lidar data associated with at least a portion of the image data. A first machine learned model can determine an object representation in the environment (e.g., a 3D bounding box) based at least in part on the image data. The image data and the lidar data can be used to determine depth data representing depth information of the environment. The object detector component can implement a second machine learned model that receives the object representation and the depth data as input and outputs a more accurate object representation usable by the vehicle computing device to control the vehicle.

In some examples, the object detector component can implement a densifier component (e.g., a point cloud densifier, or the like) configured to provide dense depth information for an environment based at least in part on sensor data from one or more sensors. In examples, the depth data can be captured from a sensor capable of directly capturing such information (e.g., a lidar, time of flight, or radar sensor) that may be less dense that information gathered from the imaging sensor (which may not inherently capture depth information). The densifier may serve to fill in depth information corresponding to dense pixels of the image data extrapolated from less dense depth data. For instance, the densifier component can output three-dimensional depth data representing one or more objects in the environment by applying a mathematical algorithm (e.g., a depth completion algorithm, etc.) and/or a machine learned model to the sensor data (e.g., image data, lidar data, map data, simulation data, environmental data, etc.). In examples, the densifier component can be configured to associated the image data and the lidar data by projecting the lidar data into the image data. In some examples, the depth information can comprise dense depth data associated with one or more pixels of the of image data. Additional details of determining depth data are described in U.S. patent application Ser. No. 17/478,602, filed on Sep. 17, 2021, entitled "Associating Image Data and Depth Data For Depth Determination," and in U.S. patent application Ser. No. 17/392,261, filed on Jul. 30, 2021, entitled "Three-Dimensional Point Clouds Based on Images and Depth Data," which are incorporated herein by reference in their entirety and for all purposes.

In various examples, the depth information from the densifier component can be input into a model (e.g., a machine learned model, a statistical model, etc.), along with bounding box data based on image data from an image sensor (e.g., one or more images from one or more cameras). The model can, for example, generate updated bounding box data (e.g., in two or three dimensions) representative of a change to an x-coordinate, y-coordinate, z-coordinate, yaw, pitch, roll, extents (e.g., length, width, height, etc.), contour, etc. associated with the bounding box data received as input.

A training component can train a machine learned model described herein in a variety of ways. For instance, a training component can determine first training data by modifying a boundary, a shape, and/or a size associated with the updated bounding box data. The training component can determine second training data based at least in part on point cloud information associated with lidar data, and train the machine learned model based at least in part on the first training data and the second training data. Additional details for training a machine learned model are discussed throughout this disclosure.

In some examples, the machine learned model can be trained to output one or more object representations that accurately represent a shape, a dimension, and/or a position of corresponding objects. The object can be a static object such as a building, crosswalk, traffic signals, etc., and/or a dynamic object such as a pedestrian, a vehicle, a truck, an animal, and so on.

Portions of the environment may, in some examples, be obscured or otherwise occluded by an object or obstacle and may be referred to as occluded regions. Because of the lack of sensor data associated with an occluded region, it may be difficult to determine whether the occluded region is free of any objects or whether the occluded region is occupied by a static obstacle or a dynamic object such as a vehicle or pedestrian. Using the techniques as described wherein, a vehicle computing device can employ a model to predict a shape of an object in the occluded regions (e.g., an area beyond a visible hood of a vehicle). In this way, objects that are at least partially occluded (e.g., difficult to "view" using sensors due to an obstacle such as a reflective surface, a building, another vehicle, a tree, and so on) can be represented by a bounding box that accurately depicts a boundary of the object in both visible and occluded regions. For instance, the object representation techniques described herein can include determining a representation of an occluded object such as a partially visible vehicle, pedestrian, and the like.

As mentioned, the vehicle computing device can control the vehicle in the environment based at least in part on an output from the object detector component (e.g., a 3D bounding box of an object). For example, the vehicle computing device can detect object(s) in the environment and use the combined 3D bounding boxes to control an action of the vehicle, such as determining a trajectory for the vehicle or otherwise causing the vehicle to traverse the environment. For instance, controlling the vehicle may comprise stopping the vehicle and/or controlling at least one of: a braking system, an acceleration system, or a drive system of the vehicle. By outputting one or more 3D bounding boxes, the vehicle can predict potential interactions with objects in the environment.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic, heuristics, and/or mathematical functions that generate approximations which are usable to make predictions.

The techniques discussed herein can improve a functioning of a vehicle computing device in a number of ways. For instance, by accurately and efficiently determining 3D bounding boxes as described herein, the vehicle computing device can determine a trajectory or other vehicle action, in less time and with a higher probability to avoid the objects (due to the accuracy of the 3D bounding boxes). For instance, by updating an image-based 3D bounding box with depth data, a planning component, a prediction component, etc. can determine a vehicle trajectory that can improve passenger comfort and safety. Accordingly, utilizing 3D bounding box data by the vehicle computing device can improve the accuracy and/or reduce a latency for the vehicle to respond to a potential collision in the environment.

Furthermore, such techniques may be used, for example, to validate the safe operation of a vehicle. In some examples, the planning component can improve functioning and safety of the vehicle by preventing the vehicle from taking additional actions that are not required (e.g., avoiding sudden braking or swerving when not needed) based on evaluating specific reasons or conditions in the environment around the vehicle that led to a prediction.

The techniques discussed herein can also leverage sensor data and perception data to enable a vehicle, such as an autonomous vehicle, to navigate through an environment while circumventing objects in the environment. In some cases, evaluating an output by a model(s) may allow an autonomous vehicle to generate more accurate and/or safer trajectories for the autonomous vehicle to traverse an environment. Techniques described herein can utilize information sensed about the objects in the environment to more accurately determine current states and future estimated states of the objects. For example, techniques described herein may be faster and/or more robust than conventional techniques, as they may increase the reliability of representations of sensor data, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination without reacting to incorrect object representations. These and other improvements to the functioning of the computing device are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Further, although discussed in the context of lidar data, the techniques can be applicable to any type of sensor data are not limited to specific examples discussed herein. Additionally, the techniques described herein can be used with real data (e.g., captured using sensor(s)), simulated data (e.g., generated by a simulator), or any combination of the two.

FIG. 1 is a pictorial flow diagram of an example process 100 of determining a three-dimensional bounding box. The example process 100 may be implemented by the computing device 202 of FIG. 2, the vehicle computing device 404 of FIG. 4, and/or the computing device(s) 438 of FIG. 4. Generally, a computing device can implement one or more models to determine data points in an environment belonging to an object, such as a pedestrian, another vehicle, and so on. Additionally or alternatively, the model(s) may determine one or more edges, boundaries, etc. that represent an outer most point of the object (and therefore closest to the vehicle). In various examples, the computing device can determine, based at least in part on the one or more determined representations of the object, a probability that the representation of the object and a portion of a vehicle associated with the computing device intersect.

An operation 102 can include receiving lidar data representing an environment. For example, the operation 102 can include receiving lidar data from one or more lidar sensors and fusing or otherwise combining the data into a single point cloud (e.g., a calibrated and aligned dataset). In some examples, the operation 102 can be performed by an autonomous vehicle as it traverses the environment. The lidar data may be associated with one or more objects in the environment including a pedestrian 104, a pedestrian 106, and another vehicle 108. In various examples, the lidar data can represent three-dimensional lidar data (e.g., a point cloud of lidar returns).

An operation 110 can include receiving image data from one or more image sensors to represent objects in the environment. In various examples, the operation 110 can be performed by the autonomous vehicle and the image data can represent or otherwise identify one or more objects in the environment. As shown in FIG. 1, the image data can at least partially overlap the lidar data and include the pedestrian 104, the pedestrian 106, and the vehicle 108 (e.g., a field of view of the image data can overlap a field of view of the lidar data). In various examples, the image data can represent two-dimensional image data comprising a plurality of pixels with each pixel including values indicative of intensity and/or depth information. By way of example and not limitation, the image data can represent one or more images of the pedestrian 104 (e.g., the pedestrian 104 in a roadway and proximate the autonomous vehicle, the pedestrian 106 near the ground).

An operation 112 can include determining dense depth data (e.g., dense depth data) based at least in part on applying a depth completion algorithm to the image data and the lidar data. For example, the operation 112 can include a densifier component receiving data representing an association between the image data and the lidar data. In some examples, the densifier component can receive lidar data projected into the image data as input data, and apply the depth completion algorithm to the input data to generate the dense depth data. In some examples, the lidar data can be sparse (e.g., have a low number of data points relative to a number of pixels associated with image data received in the operation 110) and implementing the densifier component can enable more detailed depth data (relative to not implementing the densifier component). For instance, dense depth data can be determined for the pedestrian 106 near the ground that otherwise may be associated with noisy depth estimates from the image data. The dense depth data can represent improved two or three-dimensional depth information associated with the pedestrian 104, the pedestrian 106, and the vehicle 108 versus the depth information determined from the 2D image data. For instance, the depth information determined from the 2D image data may include some pixels on the ground that are erroneously associated with the pedestrian 106 near the ground, and the dense depth data determined from the densifier component can more accurately identify which pixels are associated with the pedestrian 106 and thus provide more accurate depth estimations for the pedestrian 106.

An operation 114 can include determining a 3D bounding box associated with an object based at least in part on the image data (e.g., two-dimensional image data). For example, the operation 114 can include determining a 3D bounding box 116 for the pedestrian 104 based on the image data (though other bounding boxes may also be determined for other objects such as the pedestrian 106 and the vehicle 108). In some examples, a machine learned model may be employed to generate the 3D bounding box based on one or more images representing objects in the environment at one or more times (as opposed to generating an initial bounding box from lidar data and employing regression techniques using image data). Additional examples of determining the 3D bounding box are discussed throughout this disclosure.

An operation 118 can include determining an updated 3D bounding box. For example, the operation 118 can include a same or different machine learned model receiving the 3D bounding box data associated with the object, and the dense depth data as input to output an updated 3D bounding box 120 having additional clarity or detail relative to the 3D bounding box 116 represented by the 3D bounding box data used as input. By way of example and not limitation, a refined boundary, shape, size, position, and so on, of the updated 3D bounding box 120 can be determined by employing the techniques described herein. In some examples, an updated 3D bounding box can include portions of an occluded object (e.g., can represent the hood of the vehicle 108 that is otherwise occluded by another vehicle in FIG. 1).

By first determining a 3D bounding box from image data, more objects can be represented more quickly (versus determining the 3D bounding box from multiple modalities), however image based 3D bounding boxes can be noisy (e.g., have a shape that generally represents the object but depth and/or position may not be as accurate due to relaying on only image data). Updating the 3D bounding box from image data with dense depth data (3D data from a lidar sensor, an image sensor, and/or other sensor type) as described herein enables a vehicle computing device to provide more accurate representations of more objects versus approaches that lack such techniques. In some examples, it may be advantageous to separate sensor modalities into multiple corresponding pipelines each of which may output candidate object information detected in an environment. Separating the modalities into respective pipelines can allow objects from detected by one modality to be somewhat immune from artifacts induced by other modalities (while allowing for later determination of which combinations of object data from the different pipelines/modalities to be determined). The disclosed techniques can enable a vision pipeline to be more immune to artifacts introduced from other modalities/pipelines by initially creating a vision-only bounding box, for example, and minimally supplementing refinement of the bounding box using depth information from a different modality.

In some examples, the refined and updated 3D bounding box data can be output to component(s) of a vehicle computing device to control the vehicle (e.g., determine an action to avoid the objects in the environment). In this way, a vehicle may receive object representations from a machine learned model usable by the vehicle to quickly and/or preemptively avoid objects, thereby improving safety of the vehicle.

In some examples, operations of the process 100 can be determined in parallel for efficient use of computational resources (e.g., memory and/or processing resources). For instance, the densifier component in operation 112 can determine the dense depth data in parallel with the machine learned model that determines the 3D bounding box based on the image data. However, in other examples the densifier component may not be used and depth information associated with the lidar data (or other depth information) can be input into the model that determines the updated 3D bounding box data.

Figure 2:
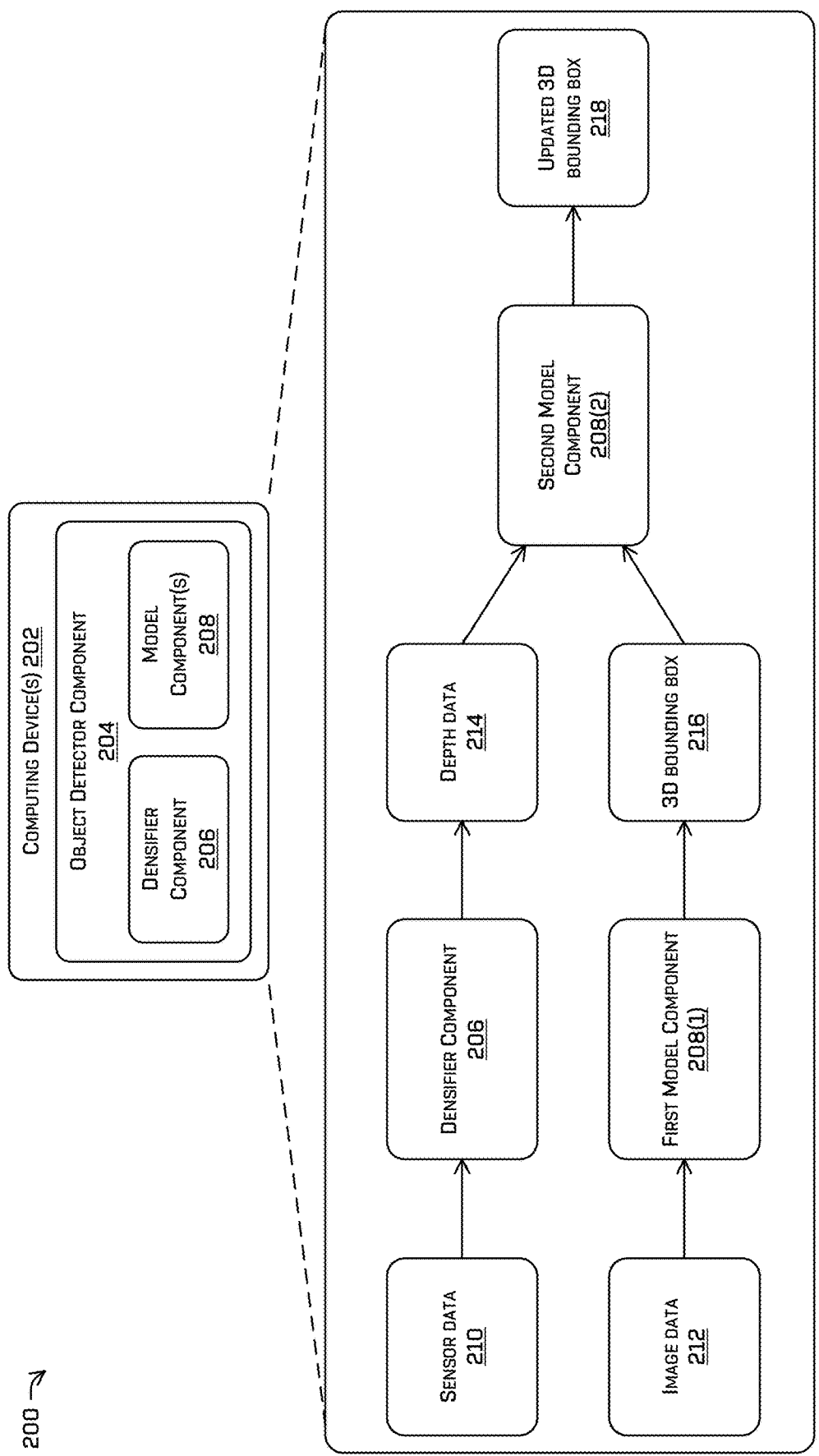
FIG. 2 is an illustration of an example computing device to determine a three-dimensional bounding box.

FIG. 2 is an illustration of an example computing device to determine a three-dimensional bounding box. As illustrated a computing device 202 includes an object detector component 204 which further includes a densifier component 206 and one or more model components 208 (also referred to as a first model component 208(1) and a second model component 208(2)). In some examples, the object representation techniques described herein may be implemented at least partially by or in association with a vehicle computing device (e.g., vehicle computing device 404 of FIG. 4) and/or a remote computing device (e.g., computing device(s) 438 of FIG. 4).

In some examples, the object detector component 204 can be configured to receive sensor data 210 for processing. In various examples, the computing device 202 may receive the sensor data 210 from one or more sensors (e.g., a lidar sensor, a radar sensor, a camera, etc.). In some examples, the sensors may include sensors mounted on a vehicle (e.g., the vehicle 402 of FIG. 4), and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like.

In some examples, the sensors may include one or more remote sensors, such as, for example sensors mounted on another autonomous vehicle, and/or sensors mounted in the environment. In various examples, the vehicle may be configured to transmit and/or receive data from other autonomous vehicles (e.g., one or more autonomous vehicles in a fleet) and/or the sensors. The data may include sensor data, such as data associated with the objects detected in the environment. In some examples, the sensors may be mounted in the environment to provide additional visibility in an area of reduced visibility (e.g., occluded regions).

In various examples, the computing device 202 can receive the sensor data 210 and can semantically classify the detected objects (e.g., determine an object type), such as, for example, whether the object is a vehicle, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by the object detector component 204 to determine an object representation (e.g., a bounding box) based on object characteristics (e.g., maximum speed, acceleration, maneuverability, etc.) associated with the classification.

The densifier component 206 represents functionality to output depth data 214 representing depth information of one or more objects associated with the sensor data 210. For example, the densifier component 206 can apply heuristics, a mathematical algorithm, and/or a machine learned algorithm, to the sensor data 210 to determine depth values (e.g., a position of an object in x, y, and z space) for pixels of the image data. In some examples, the depth data 214 can represent a distance from the sensor(s) from which the sensor data is received (and in some examples a vehicle associated therewith). In one example, the densifier component 206 can apply a depth completion algorithm to the sensor data 210 to determine dense depth data, coordinate data, position data, etc. for some or all pixels or data points of the sensor data 210.

In various examples, the densifier component 206 can output the depth data 214 to represent dense depth data associated with one or more pixels of the sensor data 210 (e.g., image data). In some examples, the depth data 214 can include a depth value for every pixel of the image data included in the depth data 214.

In some examples, the densifier component 206 can determine that a first field of view of the image sensor at least partially overlaps a second field of view of the lidar sensor, and the depth data 214 can be determined based at least in part on the first field of view of the image sensor at least partially overlapping the second field of view of the lidar sensor. In this way, the lidar data can represent regions in the environment that at least partially overlap with the regions represented by the image data.

FIG. 2 shows image data 212 being used as input to a first model component 208(1). The image data 212 is shown separately for illustration purposes, and can represent a portion of the sensor data 210 (e.g., the portion received from an image sensor). The first model component 208(1) (e.g., a first machine learned model) can receive the image data 212 and output a 3D bounding box 216. The first model component 208(1) can be configured to determine the 3D bounding box 216 from 2D image data. Accordingly, the 3D bounding box 216 can includes approximations (e.g., a size, a shape, a boundary, etc.) for refining or updating by the second model component 208(2) (e.g., a second machine learned model). While the 3D bounding box 216 determined from 2D image data may comprise some depth information suitable for enabling a vehicle to navigate, the 3D bounding box 216 and the depth data 214 can be input into the second model component 208(2) to output data representing an updated 3D bounding box 218. Generally, the updated 3D bounding box 218 can have improved depth information (for pixels, objects, etc.) than the 3D bounding box 216 while realizing the computational benefits of producing the 3D bounding box 216 from the image data 212. Further, the 3D bounding box 216 and the depth data 214 can be determined in parallel for further computational savings.

In some examples, data input into the densifier component 206 and/or the model component(s) 208 can include a crop (e.g., a reduced size or portion of image data specifically associated with an initial identification of an object) of the sensor data 210. For example, a crop of image data and/or a crop of lidar data can be used as input to process a region surrounding a detected object rather than all regions. For instance, the crop can be a size a threshold size larger than an estimated size of the object so that an area surrounding the object can be considered by the second machine learned model 208(2). By inputting a crop of the sensor data 210, the second machine learned model 208(2) can determine if any pixels in the 3D bounding box 216 should be included or excluded when determining the updated 3D bounding box 218.

In various examples, the updated 3D bounding box 218 can represent a change in an x-coordinate, y-coordinate, and/or z-coordinate (also referred to as "deltas"), yaw, pitch, roll, extents (e.g., length, width, height, etc.), contour, etc. associated with the 3D bounding box 216. Thus, the updated 3D bounding box 218 can include a depth, a position, a boundary, and so on, that is a better representation of an object than the 3D bounding box 216 though, as mentioned, the 3D bounding box 216 can still include sufficient detail for a vehicle to use during navigation. By outputting the updated 3D bounding box 218 to represent a change in an x-coordinate, y-coordinate, and/or z-coordinate associated with the 3D bounding box 216, normalization, smoothing, or other post processing optimization can be performed on the updated 3D bounding box 218 in less time versus not being represented as the deltas. In some examples, normalizing the deltas can improve depth information associated with bounding boxes at different distances (e.g., 3D bonding box determinations at further distances can be supplemented by bounding box determinations at closer distances, and vice versa).

As mentioned, the object detector component 204 can output the updated 3D bounding box 218 by implementing the second model component 208(2). Additionally or alternatively, the object detector component 204 can determine output data representative of a classification of an object, kinematics associated with the object (an object velocity, etc.), and/or an occluded region. That is, the object detector component 204 can determine an object classification (or other object characteristics) and/or presence of an occluded region independent of outputting the updated 3D bounding box 218. In some examples, the depth data 214 and the 3D bounding box 216 can be input into a machine learned model to determine a type, pose, velocity, trajectory, etc. associated with an object usable by the computing device 202 to control a vehicle.

In some examples, the object detector component 204 can output data associated with the updated 3D bounding box 218 to one or more components of a vehicle computing device including a planning component (e.g., the planning component 426 of FIG. 4) to enable the planning component to improve, verify, or reinforce determinations or decisions. For example, data associated with the updated 3D bounding box 218 can be used by the planning component to determine a vehicle trajectory that avoids the object associated with the updated 3D bounding box 218.

The computing device 202 can implement a training component (not shown) to train the first model component 208(1) and/or the second model component 208(2). For instance, the training component can train the first model component 208(1) based at least in part on image data and depth data, though other data types may also be used for training (e.g., map data, environmental data, location data, etc.). In some examples, the first model component 208(1) may be trained with depth data (e.g., lidar data, point cloud data derived from the lidar data, the depth data 214, or other data providing depth information) so that the 3D bounding box 216 is determined with consideration to depth information despite being determined from the image data 212.

In various examples, the first model component 208(1) and/or the second model component 208(2) can be trained using deformations or changes to the updated 3D bounding box 218. For example, the training component can modify a boundary, a shape, and/or a size associated with the updated 3D bounding box 218 for use as training data. In addition or in the alternative, the training component can determine training data based at least in part on point cloud information associated with the lidar data, as second training data. Further examples of training a machine learned model are discussed throughout this disclosure.

Figure 3:
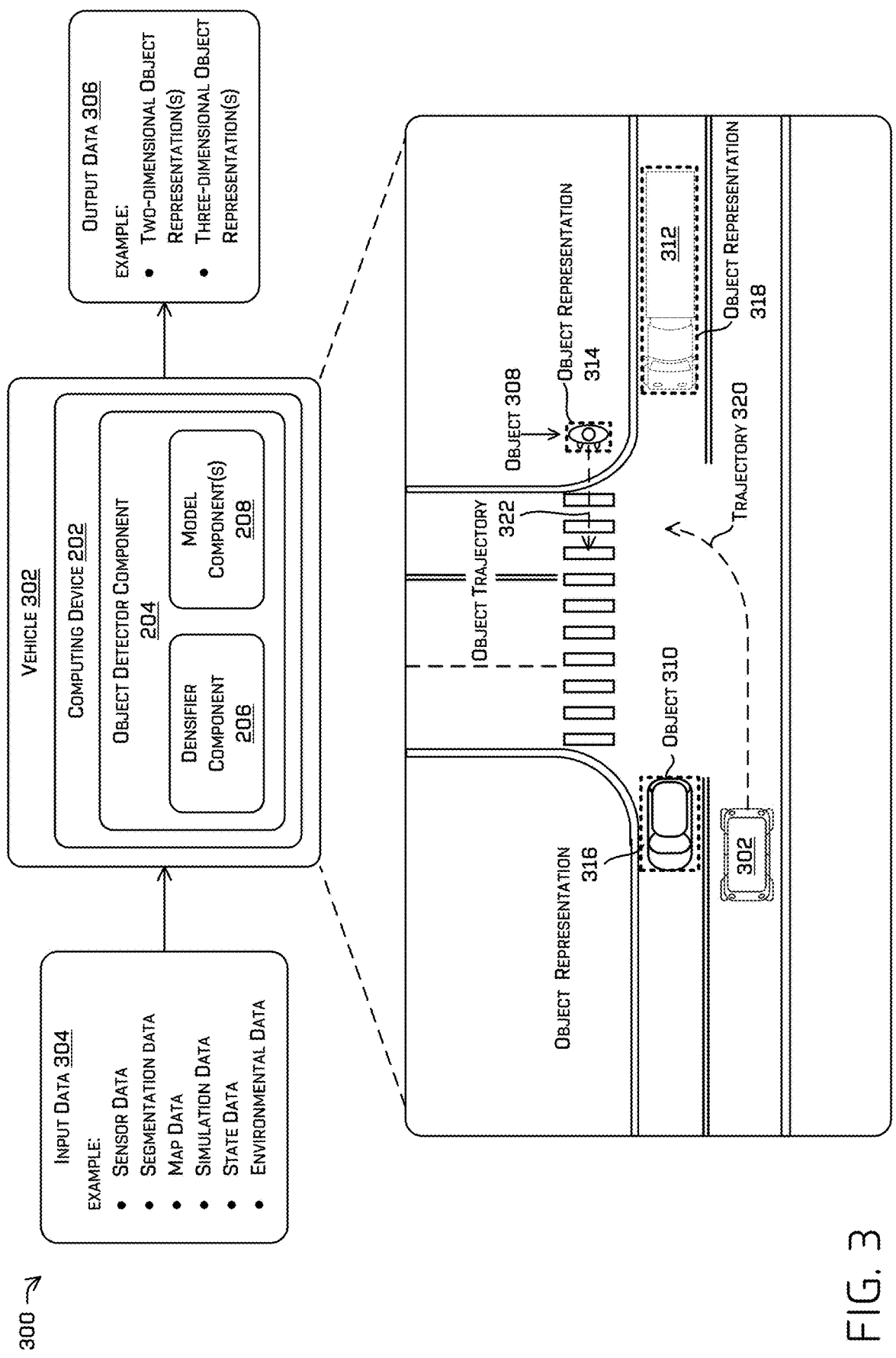
FIG. 3 is an illustration of an example environment, in which an example vehicle applies an object detector component to predict an object representation.

FIG. 3 is an illustration of an example environment 300, in which an example autonomous vehicle (vehicle 302) implements an object detector component (the object detector component 204) to predict an object representation. In some examples, the object representation techniques described herein may be implemented at least partially by or in association with the computing device 202, a vehicle computing device (e.g., vehicle computing device 404 of FIG. 4) and/or a remote computing device (e.g., computing device(s) 436 of FIG. 4).

As illustrated, the object detector component 204 receives input data 304 associated with the vehicle 302, the environment 300, and one or more objects, usable to determine output data 306. The output data 306 can represent two-dimensional object representation(s) and/or three-dimensional object representation(s) for one or more objects in the environment 300 (e.g., the updated 3D bounding box 218). In various examples, the input data 304 can include sensor data (e.g., the sensor data 210, the image data 212), segmentation data, map data, simulation data, object state data, vehicle state data, and/or environmental data, though other input data is also contemplated.

The input data 304 may represent, for example, information associated with a region (e.g., an area adjacent an object), the vehicle state (position, velocity, acceleration, trajectory, pose, etc.), the object state (position, velocity, acceleration, trajectory, pose etc.), and/or a control policy (e.g., a policy that controls the vehicle 302 relative to an object). The input data 304 may include environmental features based on the map data and/or safety thresholds (e.g., a safety range) for a speed, an acceleration, a steering, and/or a braking action.

In some examples, the input data 304 can include segmentation information comprising an object identifier identifying a particular object. For example, a machine learned model can receive segmentation data indicating different object identifiers for each object in an environment. In such examples, the machine learned model can determine updated 3D bounding box data (e.g., the output data 306) based at least in part on the segmentation data.

The computing device 202 can implement one or models or components (e.g., a perception component) to process the input data 304 to detect objects in the environment 300. In various examples, the computing device 202 can receive the input data 304 and can semantically classify the detected objects (e.g., determine an object type), such as, for example, whether the object is a pedestrian (object 308), a vehicle (object 310), a building, a truck (object 312), a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by the object detector component 204 to determine an object representation (e.g., a bounding box) based on object characteristics (e.g., maximum speed, acceleration, maneuverability, etc.). For instance, the object detector component 204 can output an object representation 314 of the pedestrian 308, an object representation 316 of the vehicle 310, and an object representation 318 of the truck 312.

In some examples, based at least in part on the classification, the object detector component 204 can select or otherwise determine a machine learned model from available machine learned models associated with different classifications. That is, one of available model components 208 can be used to represent an object based at least in part on the classification of the object. In some examples, the selected or determined machine learned model can determine 3D bounding box data associated with the object by combining image data (or a 3D bounding box associated with therewith) and depth data (point cloud data, lidar data, data values associated with one or more pixels, etc.). For instance, image data comprising two-dimensional image data including multiple pixels can be used by a first machine learned model to determine a 3D bounding boxes (e.g., the 3D bounding box 216) representing a monocular estimation of an object. In such examples, a second machine learned model can receive depth information representing an intensity value and/or a depth value for the multiple pixels, and output an updated 3D bounding box (e.g., the updated 3D bounding box 218). Of course, in some examples, the functionality associated with the first machine learned model and the second machine learned model can be performed by a single machine learned model.

In some examples, the output data 306 representing two-dimensional object representation(s) and/or three-dimensional object representation(s) can be used to classify an object. In examples when a classification of an object is performed prior to generating the output data 306, the output data 306 can be used to verify the classification. In examples when classification of an object is not performed prior to generating the output data 306, the output data 306 can be used to classify the object. In some examples, "updating" a bounding box determined from image data can include determining that the image based bounding box does not represent an object (due to a difference between extents of the image based bounding box and the object representation associated with the output data 306, due to non-maximal suppression techniques, and the like). Thus, the output data 306 can be used to determine whether or not an image based bounding box is accurate and/or whether the object associated with the image based bounding box exists.

The output data 306 can be used by the computing device 202 in a variety of ways. For instance, the computing device 202 can implement one or more models or components (e.g., a planning component) to determine a trajectory 320 for the vehicle 302 to follow in the environment 300 relative to the object 310, the object 312, and/or the object 314. For instance, the computing device 202 can identify or otherwise determine the trajectory 320 for the vehicle 302 to use at a future time based at least in part on performing a tree search or other decision technique. In various examples, the computing device 202 can identify the trajectory 320 with consideration to predicted object trajectories associated with the objects 310, 312, and/or 314. In some examples, a training component of the computing device 202 can train one or more machine learned models based at least in part on the output data 306.

Figure 4:
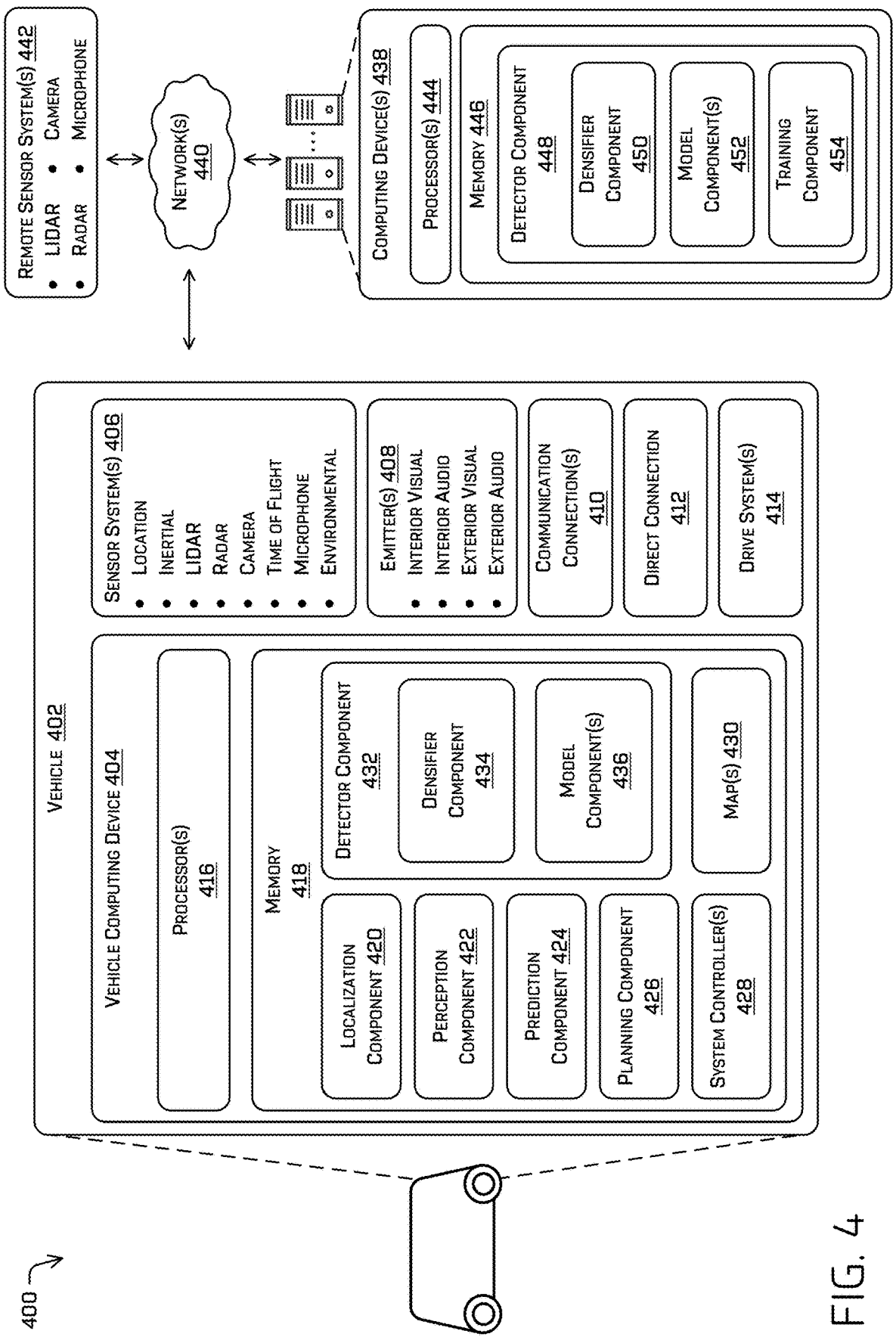
FIG. 4 is a block diagram of an example system for implementing the techniques described herein.

FIG. 4 is a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.). The communications connection(s) 410 also enable the vehicle 402 to communicate with a remote teleoperations computing device or other remote services.

The one or more communications connection(s) 410 can include physical and/or logical interfaces for connecting the computing device 404 to another computing device or one or more external networks 440 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a localization component 420, a perception component 422, a prediction component 424, a planning component 426, one or more system controllers 428, one or more maps 430, and a detector component 432 including a densifier component 434, and model component(s) 436. Though depicted as residing in the memory 418 for illustrative purposes, it is contemplated that the localization component 420, the perception component 422, the prediction component 424, the planning component 426, the one or more system controllers 428, the one or more maps 430, the detector component 432, the densifier component 434, and the model component(s) 436 may additionally, or alternatively, be accessible to the vehicle 402 (e.g., stored on, or otherwise accessible by, memory remote from the vehicle 402, such as, for example, on memory 446 of a remote computing device 438).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or a remote map component, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the detector component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the object detector component 204 as described in FIGS. 2 and 3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 438) accessible via network(s) 440. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include the detector component 432 configured to perform the functionality of the object detector component 204, including determining an object representation based on sensor data from the sensor system(s) 406 and/or remote sensor system(s) 442. In various examples, the detector component 432 may receive sensor data, vehicle data (e.g., the vehicle data 402), and the like from the perception component 422 and/or from the sensor system(s) 406. In some examples, the detector component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the detector component 432 could be part of the prediction component 424, the planning component 426, or other component(s) of the vehicle 402.

Generally, the detector component 432 can provide at least the functionality associated with the object detector component 204. In various examples, the detector component 432 can output one or more three-dimensional (3D) bounding boxes to represent object(s) proximate the vehicle 402. For instance, the detector component 432 can detect an object and generate a 3D bounding box having extents and/or an area that corresponds to the object (e.g., a size, a shape, a boundary, etc.). In some examples, the detector component 432 can output the 3D bounding boxes based at least in part on implementing the densifier component 434 and/or the model component(s) 436. For instance, the detector component 432 may receive depth data (e.g., from the densifier component 434, image data, and/or other sensor data) and vision-based data (e.g., one or more images from one or more cameras).

The densifier component 434 can include functionality to determine depth data such as dense depth data. For instance, the densifier component 434 can include at least the functionality of the densifier component 206. For example, the densifier component 434 can receive sensor data from the sensor system(s) 406 and/or remote sensor system(s) 442, and associate, as associated data, lidar data and image data representing an environment surrounding the vehicle 402. In some examples, the densifier component 434 can project the lidar data into the image data to generate depth values for pixels of the image data. The densifier component 434 can apply a depth completion algorithm to the associated data to output the depth data that represents improved depth estimates relative to the input data. In various examples, the densifier component 434 can apply a heuristic to align first data points associated with the lidar data points and second data points associated with the image data.

In examples when the densifier component 434 determining dense depth data based on a depth completion algorithm, the depth data that is projected into the image data can be utilized to determine another depth value (e.g., a second depth value) of another pixel (e.g., a second pixel) associated with another intensity value (e.g., a second intensity value). The second depth value can be determined based on the depth completion algorithm (e.g., a least squares optimization algorithm), the first intensity value, the first depth value, and the second intensity value. The second depth value can be determined based on a first subset of the image data that is associated with the depth data, and a second subset of the image data that is not associated with a measured depth value. The second subset can include the second depth value that is determined based at least in part on the depth completion algorithm.

In some examples, the intensity values of respective points of the depth data can be utilized along with the depth completion algorithm, and depth values associated with respective points, to determine remaining depth values. In those examples, the depth data that includes the intensity values can be a same or different type of depth data that includes the depth values utilized to determine the remaining depth values. Associated data that includes the intensity values of the respective points in the depth data can be utilized in any of the techniques discussed throughout the disclosure, in a similar way as the associated data (e.g., the projected data) that includes the intensity values of the respective pixels.

In some examples, differences between intensity values of points of the depth data (and/or of the image data, as discussed herein) can be utilized to determine dense depth data. A difference between an intensity value (e.g., a third intensity value) of a point (e.g., a first point) of the depth data associated with a pixel (e.g., a third pixel) and a another intensity value (e.g., a fourth intensity value) of another point (e.g., a second point) of the depth data associated with another pixel (e.g., a fourth pixel) can be utilized to determine a weight. The fourth pixel can be utilized along with the third pixel to determine the weight, based on the fourth pixel being within a threshold pixel distance to the third pixel. The weight can be utilized along with a depth value (e.g., a third depth value) of the depth data associated with third pixel, and the depth completion algorithm, to determine a depth value (e.g., a fourth depth value) associated with the fourth pixel. By way of example, the fourth depth value associated with the fourth pixel, which is not aligned with any point, can be determined by utilizing the depth completion algorithm, the third intensity value, the third depth value, and the fourth intensity value. The fourth depth value can be utilized to determine the dense depth data. Although the fourth pixel that is within a threshold pixel distance to the third pixel can be utilized to determine the weight, it is not limited as such. In some examples, any pixel that is within any pixel distance to the third pixel can be utilized to determine the weight in the same way as the fourth pixel that is within the threshold pixel distance to the third pixel Although the least squares optimization algorithm can be utilized to determine a relationship between intensity values and depth values as discussed above in this disclosure, it is not limited as such. In some examples, one or more depth completion algorithms of any types can be utilized, individually or in combination, to determine a relationship between the intensity values and the depth values in a similar way as for the least squares optimization algorithm.

The model component(s) 436 can include functionality to generate one or more 3D bounding boxes. For instance, the model component(s) 436 can include at least the functionality of the model component(s) 208. In various examples, the model component(s) 436 can generate, output, or otherwise determine a 3D bounding box based at least in part on image data, lidar data, and/or depth data from the densifier component 434. In some examples, a first machine learned model can determine a 3D bounding box from the image data, and a second machine learned model can refine the 3D bounding box to output an updated 3D bounding box. The updated 3D bounding box data can represent a change in an x-coordinate, y-coordinate, z-coordinate, yaw, pitch, roll, extents (e.g., length, width, height, etc.), contour, etc. from the 3D bounding box determined from the image data.

In various examples, determinations from the densifier component 434 and the model component(s) 436 can be performed in parallel.

In at least one example, the localization component 420, the perception component 422, the prediction component 424, the planning component 426, the one or more system controllers 428, the one or more maps 430, and the detector component 432, may process sensor data, as described above, and may send their respective outputs, over the one or more network(s) 440, to the computing device(s) 438. In at least one example, the localization component 420, the perception component 422, the prediction component 424, the planning component 426, the one or more system controllers 428, the one or more maps 430, and the detector component 432 may send their respective outputs to the remote computing device(s) 438 at a particular frequency, after a lapse of a predetermined period of time, in near real-time, etc.

In some examples, the vehicle 402 may send sensor data to the computing device(s) 438 via the network(s) 440. In some examples, the vehicle 402 may receive sensor data from the computing device(s) 438 and/or remote sensor system(s) 442 via the network(s) 440. The sensor data may include raw sensor data and/or processed sensor data and/or representations of sensor data. In some examples, the sensor data (raw or processed) may be sent and/or received as one or more log files. In one example, the sensor data can correspond to the vehicle data 402 and can include historical calibration scores for one or more sensors.

The computing device(s) 438 may include processor(s) 444 and a memory 446 storing a detector component 448, a densifier component 450, a model component(s) 452, and a training component 454. In various examples, the detector component 448 may be configured to receive data from one or more remote sensors, such as the sensor system(s) 406 and/or remote sensor system(s) 442. In some examples, the detector component 448 may be configured to process the data and send processed sensor data to the vehicle computing device 404, such as for use by the perception component 422, the prediction component 424, and/or the planning component 426. In some examples, the detector component 448 may be configured to send object representation data to the vehicle computing device 404.

The detector component 448 can provide at least the functionality associated with the object detector component 204. In various examples, the detector component 448 can output one or more three-dimensional (3D) bounding boxes to represent object(s) proximate the vehicle 402. For instance, the detector component 448 can detect an object and generate a 3D bounding box having extents and/or an area that corresponds to the object (e.g., a size, a shape, a boundary, etc.).

The densifier component 450 can include functionality to determine depth data such as dense depth data. For instance, the densifier component 450 can include at least the functionality of the densifier component 206. For example, the densifier component 450 can receive sensor data from the sensor system(s) 406 and/or remote sensor system(s) 442, and associate, as associated data, lidar data and image data representing an environment surrounding the vehicle 402. In some examples, the densifier component 434 can apply a depth completion algorithm to the associated data to output the depth data that represents improved depth estimates relative to the input data.

The model component(s) 452 can include functionality to generate one or more 3D bounding boxes. For instance, the model component(s) 452 can include at least the functionality of the model component(s) 208. In various examples, the model component(s) 452 can generate, output, or otherwise determine a 3D bounding box based at least in part on image data, lidar data, and/or depth data from the densifier component 450.

As can be understood, the components discussed herein (e.g., the detector component 448, the densifier component 450, and the model component(s) 452) are described as divided for illustrative purposes. However, the operations performed by the various components may be combined or performed in any other component.

In some instances, the training component 454 can train a machine learning model to determine object representations. For example, the training component 454 can train one of the model component(s) 436 and/or the model component(s) 452. In some examples, the training component 454 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 454 may be executed by the processor(s) 444 to train a machine learning model based on training data. The training data may include a wide variety of data, such as sensor data (e.g., lidar data, image data, etc.), depth data (e.g., dense depth data), two-dimensional bounding box data, three-dimensional bounding box data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 454 can train a machine learning model to output 3D bounding boxes having more accurate depth estimations than a depth estimate associated with a single modality. For example, the training component 454 can receive data that represents labelled depth data and/or bounding box data (e.g., publicly available data, sensor data, and/or a combination thereof), lidar data, image data, and so on. In various examples, data received from the detector component 432 and/or the detector component 448 can be modified, altered, or otherwise perturbed to provide training data with variations to determined bounding boxes. At least a portion of the data can be used as an input to train the machine learning model. Thus, by providing data where the vehicle traverses an environment, the training component 454 can be trained to output 3D bounding box data sufficient to avoid potential intersection(s) associated with objects, as discussed herein.

In some examples, the training component 454 can receive a ground truth bounding box associated with a training object, and modify at least one of a boundary, a shape, or a size associated with the ground truth bounding box for training.

In some examples, the training component 454 can include training data that has been generated by a simulator.

For example, simulated training data can represent examples where a vehicle collides with an object in an environment or nearly collides with an object in an environment, to provide additional training examples.

Determinations by the detector component 432 and/or the detector component 448 can be used by various components of the vehicle computing device 404. For example, calibration scores associated with a region and/or a sensor can be used to cause the vehicle 402 to take an action (e.g., a relatively low score can cause the vehicle to stop, pull over, etc., determine a maximum speed for the vehicle to operate, etc.) and/or cause a change in sensor contributions (e.g., a poorly operating sensor can contribute less to sensor fusion).

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 446, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 416 of the computing device 404 and the processor(s) 444 of the computing device(s) 438 can be any suitable processor capable of executing instructions to process data and perform operations as described herein. By way of example and not limitation, the processor(s) 416 and the processor(s) 444 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the vehicle computing device 404 and the memory 446 of the computing device(s) 438 are examples of non-transitory computer-readable media. The memory 418 and the memory 446 can store an operating system and one or more software applications, instructions, programs, and/or data to implement the methods described herein and the functions attributed to the various systems. In various implementations, the memory 418 and 446 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide accurate object presentations that allow for the safe operation of an autonomous vehicle.

It should be noted that while FIG. 4 is illustrated as a distributed system, in alternative examples, components of the vehicle 402 may be associated with the computing device(s) 438 and/or components of the computing device(s) 438 may be associated with the vehicle 402. That is, the vehicle 402 may perform one or more of the functions associated with the computing device(s) 438, and vice versa.

Figure 5A:
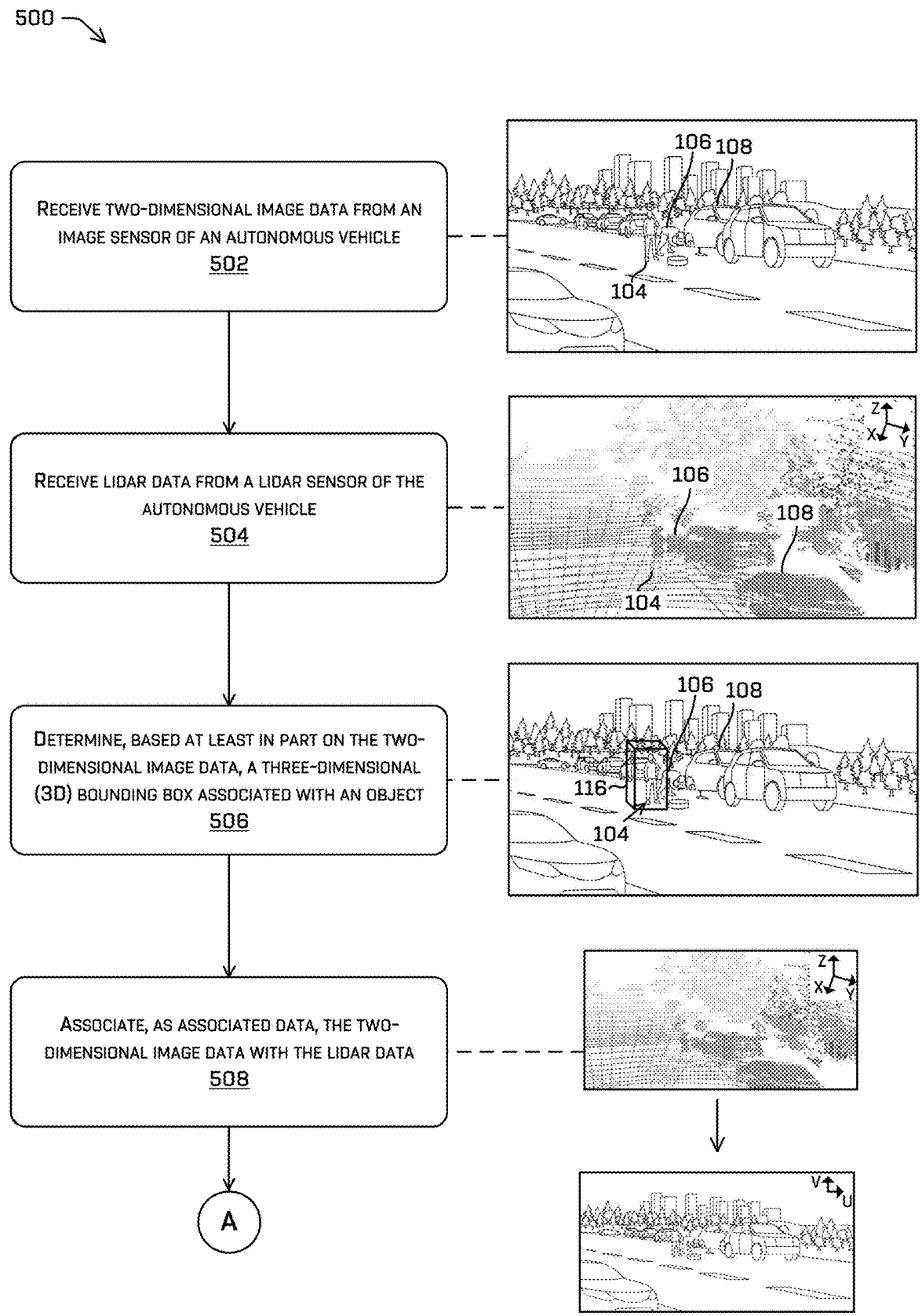
FIG. 5A is a first part of a flowchart depicting an example process for determining a three-dimensional bounding box using one or more example models.

FIG. 5A is a first part of a flowchart depicting an example process 500 for determining a three-dimensional bounding box using one or more example models. For example, some or all of the process 500 can be performed by one or more components in FIGS. 1-4, as described herein. For example, some or all of the process 500 can be performed by the vehicle computing device 404, the computing device(s) 438, or the computing device 202. However, the process 500 is not limited to being performed by these components, and the components are not limited to performing the process 500.

At operation 502, the process 500 can include receiving two-dimensional image data from an image sensor of an autonomous vehicle. In some examples, the operation 502 may include the detector component 432 of the vehicle computing device 404 receiving two-dimensional image data from one or more cameras associated with the vehicle 402. For instance, the detector component 432 can receive one or more images of an environment surrounding the vehicle 402 from the perception component 422. In some examples, the image data represents objects detected the environment, such as the object 308 (a pedestrian) and the object 312 (a truck). The two-dimensional image data may be received from one or more sensors on the vehicle and/or from one or more remote sensors (e.g., a sensor in the environment and/or a sensor on another vehicle).

At operation 504, the process may include receiving lidar data from a lidar sensor of the autonomous vehicle. In some examples, the operation 504 may include a vehicle computing device generating, estimating, or otherwise receiving lidar data associated with a portion of the image data. In various examples, the lidar data and the image data can partially overlap (e.g., have field of views that partially overlap). The lidar data can represent lidar returns captured by one or more lidar sensors (e.g., lidar sensor(s) coupled to the vehicle 402 and/or remote from the vehicle 402).

At operation 506, the process may include determining, based at least in part on the two-dimensional image data, a three-dimensional (3D) bounding box associated with an object. In some examples, the operation 506 may include a first machine learned model (e.g., the model component 436) generating, estimating, or otherwise determining an 3D bounding boxes to represent the object 308 and/or the object 312. The operation 506 may include, for example, a vehicle computing device implementing the machine learned model trained with depth data such that the 3D bounding box includes some depth information for one or more pixels of the image data. To improve depth estimates of the 3D bounding box, depth data can be considered as explained below and elsewhere. By way of example and not limitation, in examples when a pedestrian is near the ground (e.g., the pedestrian 106), the depth information may represent a generalization with an actual position or depth of the object varying from the 3D bounding box by a threshold amount. For instance, to mitigate this variation, lidar data can be processed along with the image data used to generate the 3D bounding box to improve the depth information.

At operation 508, the process may include associating, as associated data, the two-dimensional image data with the lidar data. In some examples, the operation 510 may include the densifier component 434 projecting, combining, or otherwise associating the lidar data and the two-dimensional image data, though other data types may also be associated. For instance, the densifier component 434 can determine an association between the lidar data and the image data based at least in part on applying a heuristic to align the lidar data and the image data. In some examples, pixels associated with the image data can include depth information, and the densifier component 434 can combine depth information from the lidar data with the depth information from the image data. Associating the image data with the lidar data can include applying a heuristic, a mathematical algorithm (e.g., a dense depth completion algorithm), and/or a machine learned algorithm to sensor data from two different modalities (e.g., the lidar data from a lidar sensor and the image data from an image sensor).

Figure 5B:
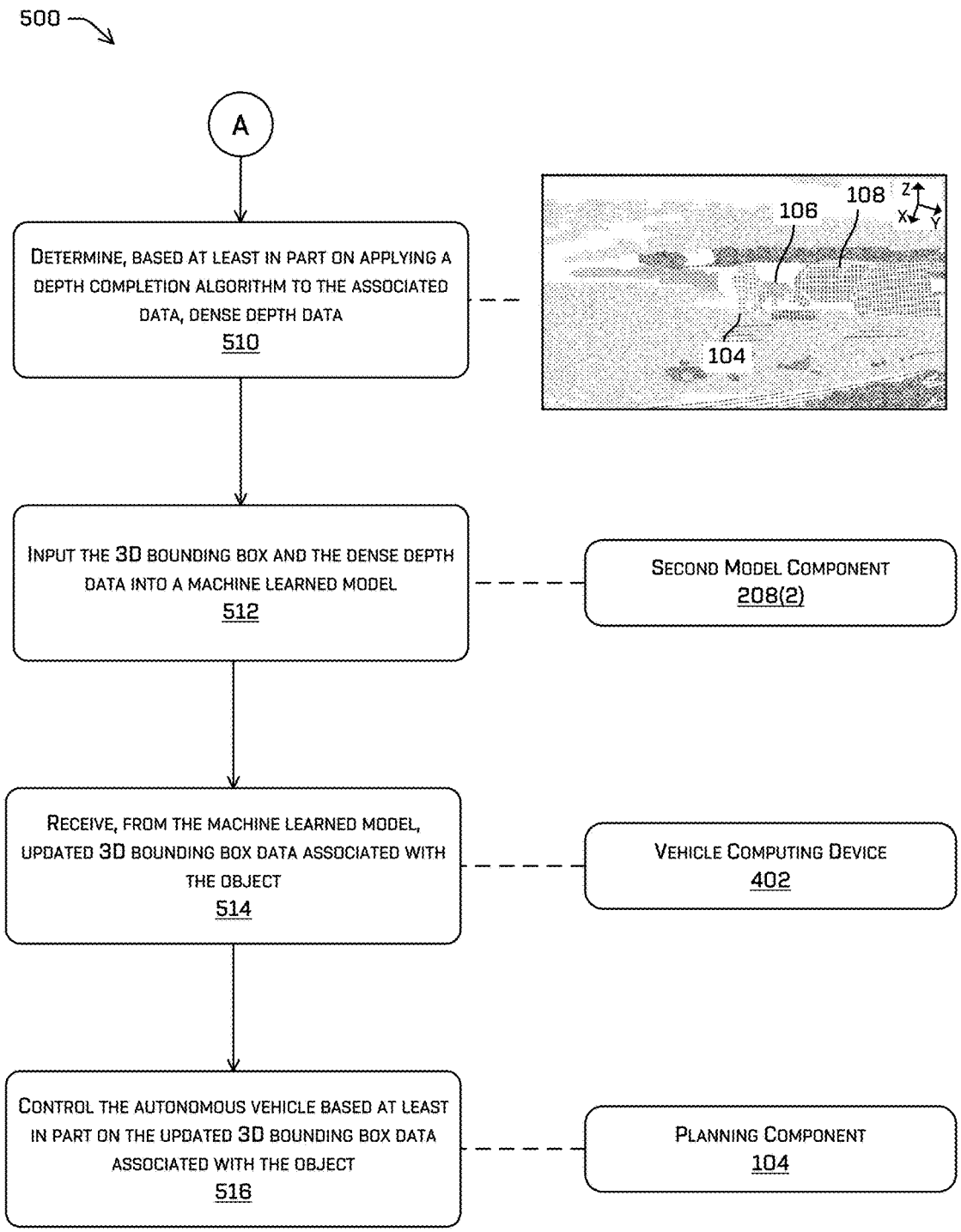
FIG. 5B is a second part of the flowchart depicting the example process for determining a three-dimensional bounding box using one or more example models.

FIG. 5B is a second part of the flowchart depicting the example process 500 for determining a three-dimensional bounding box using one or more example models.

At operation 510, the process may include determining, based at least in part on applying a depth completion algorithm to the associated data, dense depth data. In some examples, the operation 510 may include the densifier component 434 determining the dense depth data based at least in part on the associated lidar data and image data. For instance, the densifier component 434 can receive lidar data that is sparse relative to the image data, and determine a depth value for pixels of the image data. In some examples, the dense depth data can represent depth information for a pedestrian, or other object, near a ground surface, near the autonomous vehicle, or in another location that may be associated with coarse lidar data. The operation 510 may include, for example, the vehicle computing device implementing the densifier component 434 to determine depth information for some or all pixels of the image data.

At operation 512, the process may include inputting the 3D bounding box and the dense depth data into a machine learned model. In some examples, the operation 512 may include the vehicle computing device inputting the 3D bounding box determined from the image data and the dense depth data from the depth component 434 into the model component 208(2) to determine an updated 3D bounding box. However, in some examples, depth data associated with the lidar data can be input into the model component 208(2) (as opposed to an output from the densifier component 434).

At operation 514, the process may include receiving, from the machine learned model, updated 3D bounding box data associated with the object. In some examples, the operation 514 may include the model component 208(2) modifying a shape, a size, a boundary, and so on of the 3D bounding box determined from the image data by applying a machine learned algorithm to the 3D bounding box and the dense depth data. The updated 3D bounding box data can represent a difference in an x-coordinate, y-coordinate, z-coordinate, yaw, pitch, roll, extents (e.g., length, width, height, etc.), contour, etc. from a boundary of the 3D bounding box determined from the image data.

At operation 516, the process may include controlling the autonomous vehicle based at least in part on the updated 3D bounding box data associated with the object. In some examples, the operation 516 may the vehicle computing device controlling a braking system, an acceleration system, a steering system, s drive system, etc. of the vehicle 402 according to (e.g., follow) a trajectory (e.g., the trajectory 320). In some examples, the operation 516 may also, or instead, include sending the updated 3D bounding box data to one or more components of the vehicle computing device and/or to a remote computing device (e.g., the computing device(s) 438) for training one or more models implemented by the detector component 432.

FIGS. 5A and 5B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples described herein.

A: A system comprising: one or more processors; and one or more non-transitory computer-readable media storing computer-executable instructions that, when executed, cause the one or more processors to perform operations comprising: receiving two-dimensional image data from an image sensor of an autonomous vehicle; receiving lidar data from a lidar sensor of the autonomous vehicle, the lidar data associated with a portion of the two-dimensional image data; determining, based at least in part on the two-dimensional image data, a three-dimensional (3D) bounding box associated with an object; associating, as associated data, the two-dimensional image data with the lidar data; determining, based at least in part on applying a depth completion algorithm to the associated data, dense depth data; inputting the 3D bounding box and the dense depth data into a machine learned model; receiving, from the machine learned model, updated 3D bounding box data associated with the object; and controlling the autonomous vehicle based at least in part on the updated 3D bounding box data associated with the object.

B: The system of paragraph A, wherein: at least a portion of the two-dimensional image data and the lidar data represent an overlapping field of view, and associating the two-dimensional image data with the lidar data comprises projecting the lidar data into the two-dimensional image data.

C: The system of paragraph A or B, wherein the updated 3D bounding box data represents a change in at least one of: an x-coordinate, a y-coordinate, a z-coordinate, a yaw, a pitch, a roll, height, a width, or a length associated with a portion of the 3D bounding box.

D: The system of any of paragraphs A-C, the operations further comprising: receiving a ground truth bounding box associated with a training object; modifying at least one of a boundary, a shape, or a size associated with the ground truth bounding box; determining, based at least in part on the modifying, first training data; determining, based at least in part on point cloud information associated with training lidar data, second training data; and training, based at least in part on the first training data and the second training data, the machine learned model.

E: The system of any of paragraphs A-D, wherein the object is an occluded object, and the operations further comprise predicting the updated 3D bounding box data for the occluded object.

F: One or more non-transitory computer-readable media storing instructions executable by one or more processors, wherein the instructions, when executed, cause the one or more processors to perform operations comprising: receiving image data from an image sensor; determining, based at least in part on the image data, a three-dimensional (3D) bounding box associated with an object; determining depth data associated with the object; and refining, based on the depth data, the 3D bounding box to obtain an updated 3D bounding box associated with the object.

G: The one or more non-transitory computer-readable media of paragraph F, the operations further comprising: controlling a vehicle based at least in part on the updated 3D bounding box.

H: The one or more non-transitory computer-readable media of paragraph F or G, the operations further comprising: determining that a first field of view of the image sensor at least partially overlaps a second field of view of a sensor associated with the depth data, wherein determining the depth data is further based at least in part on the first field of view of the image sensor at least partially overlapping the second field of view of the sensor.

I: The one or more non-transitory computer-readable media of any of paragraphs F-H, the operations further comprising: inputting the image data into a machine learned model; and receiving, from the machine learned model, segmentation information comprising an object identifier identifying the object, wherein the updated 3D bounding box is based at least in part on the segmentation information.

J: The one or more non-transitory computer-readable media of any of paragraphs F-I, wherein: the depth data comprises at least one of: a depth value for every pixel of the image data or densified depth data associated with one or more pixels of the image data.

K: The one or more non-transitory computer-readable media of any of paragraphs F-J, wherein the depth data is associated with lidar data, and the operations further comprising: projecting the lidar data into a crop of the image data, wherein determining the depth data is based at least in part on projecting the lidar data into the crop.

L: The one or more non-transitory computer-readable media of any of paragraphs F-K, the operations further comprising: determining a classification of the object; and performing, based at least in part on the classification, at least one of: determining a machine learned model from available machine learned models associated with different classifications; or determining the updated 3D bounding box associated with the object.

M: The one or more non-transitory computer-readable media of any of paragraphs F-L, wherein: the image data comprises multiple pixels, the 3D bounding box associated with the object represents a monocular estimation based at least in part on the image data, and the depth data includes an intensity value and a depth value of a pixel of the multiple pixels.

N: The one or more non-transitory computer-readable media of any of paragraphs F-M, the operations further comprising: receiving, as first training data, depth data associated with an environment; receiving, as second training data, 3D bounding box data; and training a machine learned model to output the 3D bounding box associated with the object.

O: The one or more non-transitory computer-readable media of any of paragraphs F-N, wherein the updated 3D bounding box represents a change in at least one of: an x-coordinate, a y-coordinate, a z-coordinate, a yaw, a pitch, or a roll associated with a portion of the 3D bounding box.

P: The one or more non-transitory computer-readable media of any of paragraphs F-O, the operations further comprising: receiving a ground truth bounding box associated with a training object; modifying at least one of a boundary, a shape, or a size associated with the ground truth bounding box; determining, based at least in part on the modifying, first training data; determining, based at least in part on point cloud information associated with training lidar data, second training data; and training, based at least in part on the first training data and the second training data, a machine learned model.

Q: A method comprising: receiving image data from an image sensor; determining, based at least in part on the image data, a three-dimensional (3D) bounding box associated with an object; determining depth data associated with the object; and refining, based on the depth data, the 3D bounding box to obtain an updated 3D bounding box associated with the object.

R: The method of paragraph Q, further comprising: controlling a vehicle based at least in part on the updated 3D bounding box.

S: The method of paragraph Q or R, wherein the depth data is associated with lidar data, and further comprising: projecting the lidar data into a crop of the image data, wherein determining the depth data is based at least in part on projecting the lidar data into the crop.

T: The method of any of paragraphs Q-S, wherein the updated 3D bounding box data represents a change in in at least one of: an x-coordinate, a y-coordinate, a z-coordinate, a yaw, a pitch, a roll, height, a width, or a length associated with a portion of the 3D bounding box.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer readable media storing computer executable instructions that, when executed, cause the one or more processors to perform operations comprising:
receiving two-dimensional image data from an image sensor of an autonomous vehicle;
receiving lidar data from a lidar sensor of the autonomous vehicle, the lidar data associated with a portion of the two-dimensional image data;
determining, based at least in part on the two-dimensional image data and independent of requiring the lidar data, a three-dimensional (3D) bounding box associated with an object;
combining, as combined depth data, first depth information associated with the two-dimensional image data with second depth information associated with the lidar data;
determining, based at least in part on the lidar data and applying a depth completion algorithm to the combined depth data, dense depth data including third depth information having a higher density than the second depth information associated with the lidar data;
inputting the 3D bounding box and the dense depth data into a trained machine learned model;
receiving, from the trained machine learned model, updated 3D bounding box data associated with the object, the updated 3D bounding box data determined based at least in part on the 3D bounding box and the dense depth data; and
controlling the autonomous vehicle based at least in part on the updated 3D bounding box data associated with the object.

2. The system of claim 1, wherein:
at least a portion of the two-dimensional image data and the lidar data represent an overlapping field of view, and
associating the two-dimensional image data with the lidar data comprises projecting the lidar data into the two-dimensional image data.

3. The system of claim 1, wherein the updated 3D bounding box data represents a change in at least one of: an x-coordinate, a y-coordinate, a z-coordinate, a yaw, a pitch, a roll, height, a width, or a length associated with a portion of the 3D bounding box.

4. The system of claim 1, the operations further comprising:
   receiving a ground truth bounding box associated with a training object;
   modifying at least one of a boundary, a shape, or a size associated with the ground truth bounding box;
   determining, based at least in part on the modifying, first training data;
   determining, based at least in part on point cloud information associated with training lidar data, second training data; and
   determining, based at least in part on the first training data and the second training data, the trained machine learned model.

5. The system of claim 1, wherein the object is an occluded object, and the operations further comprise predicting the updated 3D bounding box data for the occluded object.

6. One or more non transitory computer readable media storing instructions executable by one or more processors, wherein the instructions, when executed, cause the one or more processors to perform operations comprising:
   receiving image data from an image sensor associated with a vehicle;
   receiving lidar data from a lidar sensor of the vehicle, the lidar data associated with a portion of the image data;
   determining, by a machine learned model and based at least in part on the image data and independent of requiring the lidar data, a three-dimensional (3D) bounding box associated with an object;
   combining, as combined depth data, first depth information associated with the image data with second depth information associated with the lidar data;
   determining, based at least in part on the lidar data and applying a depth completion algorithm to the combined depth data, dense depth data including third depth information having a higher density than the second depth information associated with the lidar data;
   inputting the 3D bounding box and the combined depth data associated with the object into a trained machine learned model; and
   refining, based on the combined depth data and by the trained machine learned model, the 3D bounding box to obtain an updated 3D bounding box associated with the object.

7. The one or more non transitory computer readable media of claim 6, the operations further comprising:
   controlling the vehicle based at least in part on the updated 3D bounding box.

8. The one or more non transitory computer readable media of claim 6, the operations further comprising:
   determining that a first field of view of the image sensor at least partially overlaps a second field of view of the lidar sensor associated with the lidar data,
   wherein combining the first depth information and the second depth information is based at least in part on the first field of view of the image sensor at least partially overlapping the second field of view of the lidar sensor.

9. The one or more non transitory computer readable media of claim 6, wherein the machine learned model is a first machine learned model, and the operations further comprising:
   inputting the image data into a second machine learned model;
   receiving, from the second machine learned model, segmentation information comprising an object identifier identifying the object; and
   inputting the segmentation information into the trained machine learned model,
   wherein the updated 3D bounding box is based at least in part on the segmentation information.

10. The one or more non transitory computer readable media of claim 6, wherein:
    the first depth information comprises at least one of: a depth value for every pixel of the image data or densified depth data associated with one or more pixels of the image data.

11. The one or more non transitory computer readable media of claim 6, the operations further comprising:
    projecting the lidar data into a crop of the image data,
    wherein the combined depth data is based at least in part on projecting the lidar data into the crop.

12. The one or more non transitory computer readable media of claim 6, the operations further comprising:
    determining a classification of the object; and
    performing, based at least in part on the classification, at least one of:
      determining the machine learned model from available machine learned models associated with different classifications; or
      determining the updated 3D bounding box associated with the object.

13. The one or more non transitory computer readable media of claim 6, wherein:
    the image data comprises multiple pixels,
    the 3D bounding box associated with the object represents a monocular estimation based at least in part on the image data, and
    the first depth information includes an intensity value and a depth value of a pixel of the multiple pixels.

14. The one or more non transitory computer readable media of claim 6, the operations further comprising:
    receiving, as first training data, depth data associated with an environment;
    receiving, as second training data, 3D bounding box data; and
    training the machine learned model to output the 3D bounding box associated with the object.

15. The one or more non transitory computer readable media of claim 6, wherein the updated 3D bounding box represents a change in at least one of: an x-coordinate, a y-coordinate, a z-coordinate, a yaw, a pitch, or a roll associated with a portion of the 3D bounding box.

16. The one or more non transitory computer readable media of claim 6, the operations further comprising:
    receiving a ground truth bounding box associated with a training object;
    modifying at least one of a boundary, a shape, or a size associated with the ground truth bounding box;
    determining, based at least in part on the modifying, first training data;
    determining, based at least in part on point cloud information associated with training lidar data, second training data; and
    training, based at least in part on the first training data and the second training data, the machine learned model.

17. A method comprising:
    receiving image data from an image sensor associated with a vehicle;
    receiving lidar data from a lidar sensor of the vehicle, the lidar data associated with a portion of the image data;

determining, by a machine learned model and based at least in part on the image data and independent of requiring the lidar data, a three-dimensional (3D) bounding box associated with an object;

combining, as combined depth data, first depth information associated with the image data with second depth information associated with the lidar data;

determining, based at least in part on the lidar data and applying a depth completion algorithm to the combined depth data, dense depth data including third depth information having a higher density than the second depth information associated with the lidar data;

inputting the 3D bounding box and the combined depth data associated with the object into a trained machine learned model; and refining, based on the combined depth data and by the trained machine learned model, the 3D bounding box to obtain an updated 3D bounding box associated with the object.

18. The method of claim 17, further comprising:

controlling the vehicle based at least in part on the updated 3D bounding box.

19. The method of claim 17 further comprising:

projecting the lidar data into a crop of the image data, wherein the combined depth data is based at least in part on projecting the lidar data into the crop.

20. The method of claim 17, wherein the updated 3D bounding box data represents a change in in at least one of: an x-coordinate, a y-coordinate, a z-coordinate, a yaw, a pitch, a roll, height, a width, or a length associated with a portion of the 3D bounding box.

* * * * *